United States Patent [19]

Heydrich

[11] Patent Number: 4,992,024
[45] Date of Patent: Feb. 12, 1991

[54] MULTI-FILM FLUID BEARING DAMPER

[75] Inventor: Hans Heydrich, Phoenix, Ariz.

[73] Assignee: Allied-Signal Inc., Morris Township, N.J.

[21] Appl. No.: 450,932

[22] Filed: Dec. 13, 1989

[51] Int. Cl.$^5$ .................................... F01D 25/16
[52] U.S. Cl. ............................. 415/229; 415/133; 384/99
[58] Field of Search ............... 415/170.1, 229, 129, 415/133; 277/22, DIG. 9; 384/99

[56] References Cited

U.S. PATENT DOCUMENTS

| | | | |
|---|---|---|---|
| 3,040,598 | 6/1962 | Warren | 74/574 |
| 3,263,907 | 8/1966 | Van Nimwegen et al. | 415/229 |
| 3,366,427 | 1/1968 | Silver et al. | 384/103 |
| 3,382,014 | 5/1968 | Marley | 384/106 |
| 3,391,966 | 7/1968 | Chapman | 384/99 |
| 3,635,534 | 1/1972 | Barnett | 384/106 |
| 3,655,248 | 4/1972 | Hirs | 384/100 |
| 3,761,149 | 9/1973 | Ferguson | 384/114 |
| 3,765,732 | 10/1973 | Watt | 384/104 |
| 3,809,443 | 5/1974 | Cherubim | 384/106 |
| 3,884,534 | 5/1975 | Winn | 384/106 |
| 3,936,103 | 2/1976 | Byrns et al. | 384/99 |
| 3,941,434 | 3/1976 | Schurger et al. | 384/120 |
| 4,082,375 | 4/1978 | Fortmann | 384/105 |
| 4,133,585 | 1/1979 | Licht | 384/103 |
| 4,213,661 | 7/1980 | Marmol | 384/99 |
| 4,222,618 | 9/1980 | Miller, Jr. | 384/99 |
| 4,223,958 | 9/1980 | Gray | 384/99 |
| 4,247,155 | 1/1981 | Fortmann | 384/124 |
| 4,274,683 | 6/1981 | Gray et al. | 384/106 |
| 4,336,968 | 6/1982 | Hibner | 384/99 |
| 4,337,983 | 7/1982 | Hibner | 384/99 |
| 4,415,280 | 11/1983 | Agrawal | 384/103 |
| 4,415,281 | 11/1983 | Agrawal | 384/103 |
| 4,647,227 | 3/1987 | Clebant | 384/99 |
| 4,669,893 | 6/1987 | Chalaire et al. | 384/99 |
| 4,688,989 | 8/1987 | Kondo et al. | 415/229 |
| 4,743,125 | 5/1988 | Dammel et al. | 384/99 |
| 4,783,179 | 11/1988 | Katayama et al. | 384/99 |

FOREIGN PATENT DOCUMENTS

| | | | |
|---|---|---|---|
| 3736477 | 5/1989 | Fed. Rep. of Germany | 384/99 |
| 934065 | 6/1982 | U.S.S.R. | 384/99 |

OTHER PUBLICATIONS

European Patent No. 95,961, Dec. 1983.

Primary Examiner—John T. Kwon
Attorney, Agent, or Firm—James W. McFarland; Robert A. Walsh

[57] ABSTRACT

A fluid bearing damper for damping radial motion of a bearing includes a plurality of concentric, circular, thin shims located in an annular damping chamber to present thin, radially stacked damping cavities. A portion of the shims have protruding radial lands that partially define the cavities, carry radial loads through the damper and produce a controlled mechanical centering force as well as serving to ensure replenishment of fluid film cavities.

12 Claims, 2 Drawing Sheets

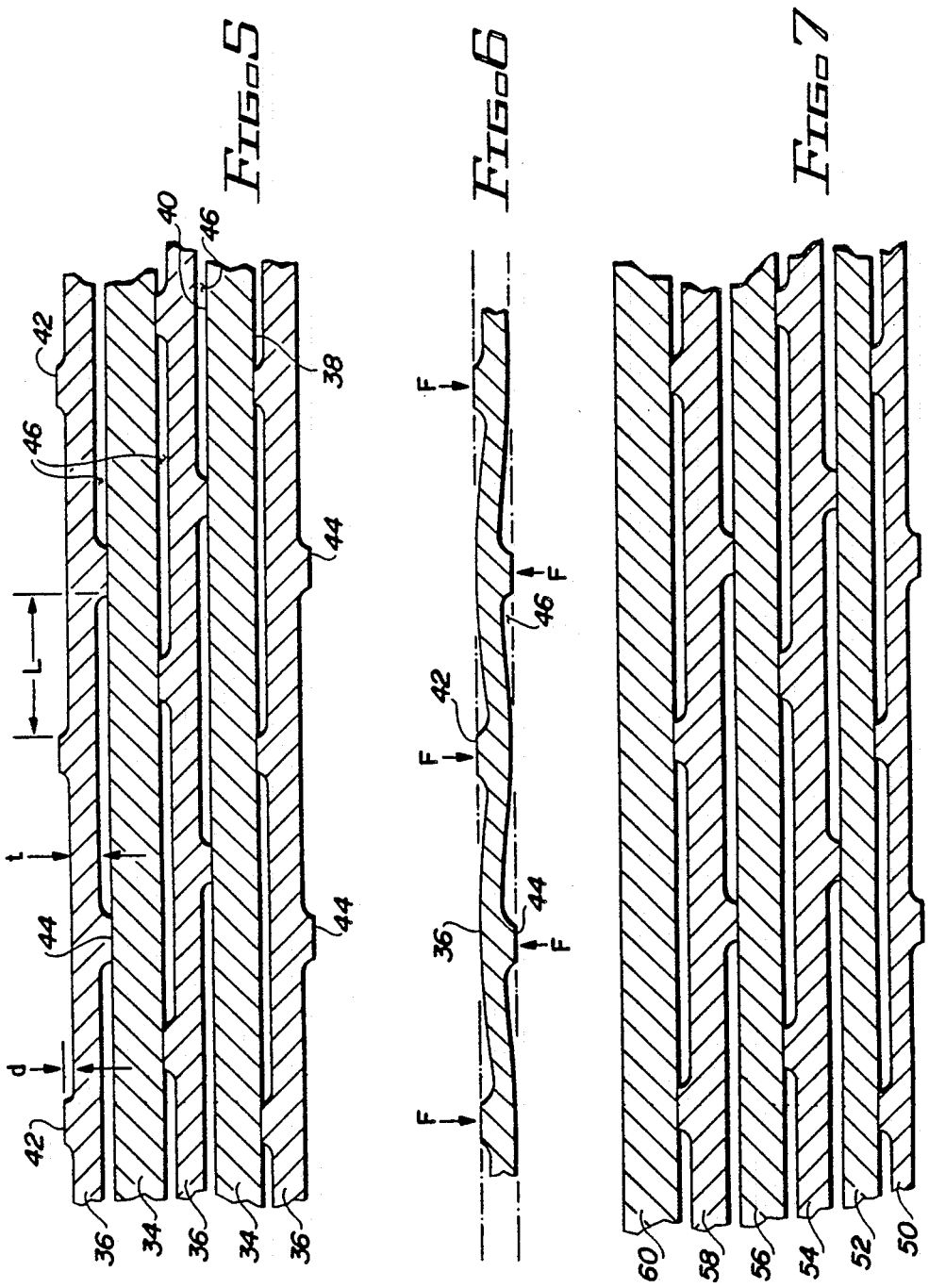

MULTI-FILM FLUID BEARING DAMPER

TECHNICAL FIELD

The present invention relates to turbo machinery and high speed bearings therefor, and more specifically relates to squeeze film type oil dampers for such bearings.

BACKGROUND OF THE INVENTION

Rotary machinery such as high speed turbo machinery typically include rotors which are subject to radial excursion such as by vibration or synchronous or nonsynchronous exitation. In certain applications of such turbine machinery, such as may be utilized in an aircraft application, the rotor may have a duty cycle requiring it to function for a limited period of time in the event of internal damage during operation thereof which introduces a substantial weight unbalance on the rotating unit.

One well known effective manner of accommodating certain radial motion of the rotating unit is the utilization of fluid film damping apparatus associated with the bearing carrying the rotor. Incompressible fluid such as oil is introduced into an annular chamber surrounding the outside of the bearing. Radial motion of the bearing relative to the chamber creates hydrodynamic pressure therein to oppose radial movement. The shearing action occurring upon the liquid effectively dampens the radial motion. Characteristically, such a damping system which may be referred to as a separate damping system, is disposed and arranged such that it accomplishes this single, sole purpose, in contrast to dampers within the bearing itself which also must be designed to function as a portion of the bearing.

One drawback to existing radial bearing dampers is their limited ability to accommodate shaft excursion. More specifically, the hydrodynamic pressure build up and fluid shearing action effectively occurs only when the radial space becomes very, very narrow. Furthermore, known hydraulic fluid bearing dampers do not readily produce mechanical restoring forces within the damper which are necessary for their continued operation.

SUMMARY OF THE INVENTION

It is an object of the present invention to provide turbo machinery and fluid damping bearing apparatus therefor which provides greater radial excursion capacity by providing a plurality of separate, radially arranged, fluid squeeze films whose damping actions are complementary and additive to one another.

It is another object of the present invention to provide such an improved damping structure which can produce greater damping capacity and provide a self-centering feature by inclusion of a mechanical centering or restoring force. The self-cantering feature is not dependent on fluid dynamics but operates at all times even if the fluid is absent or if no motion is present.

In summary, the present invention provides an improved hydraulic squeeze film damper for a rotary bearing by including a plurality of radially stacked shims configured and arranged to present squeeze film damping cavities therebetween in a radially stacked relationship. The cavities are very thin radially in both loaded and unloaded conditions, assuring laminar fluid flow therein at substantially all times. Preferably, the shims are in two sets, interdigitated with one another, with one set having radial protrusions or legs to define the cavities therebetween. Further, the alternately inwardly and outwardly extending legs through which the radial load is transmitted produces bending moments upon deflection of the shims under load to produce a self-centering mechanical spring action within the damper itself.

These and other objects and advantages of the present invention are specifically set forth in or will become apparent from the following detailed description of a preferred form of the invention when read in conjunction with the accompanying drawings.

BRIEF DESCRIPTION OF THE DRAWINGS

FIG. 5 is an enlarged cross-sectional view of a portion of the shim stack of FIG. 3, but as projected linearly for clarity;

FIG. 6 is a view of a single shim as projected in FIG. 5 but showing the shim deflected under load; and FIG. 7 is a view similar to FIG. 5 but showing an alternate embodiment of the present invention.

DETAILED DESCRIPTION OF THE INVENTION

Figure 1:
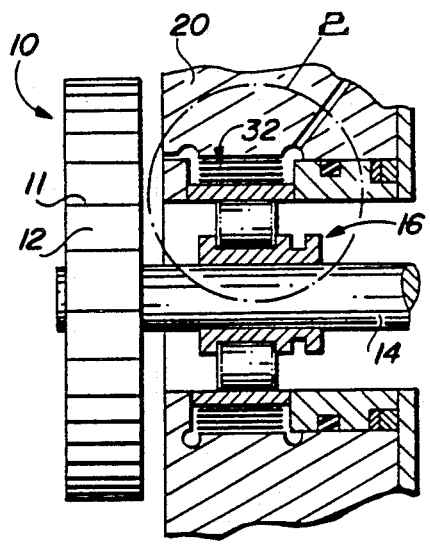
FIG. 1 is a cross-sectional plan view of turbo machinery incorporating the present invention.
Figure 2:
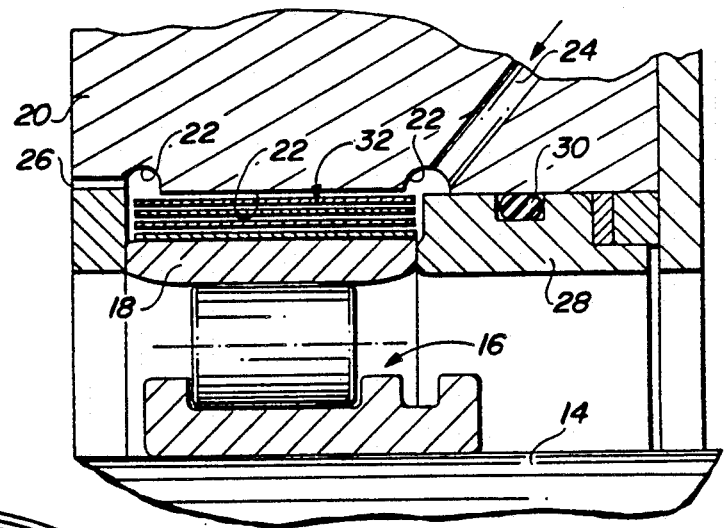
FIG. 2 is an enlarged cross-sectional plan view of the bearing portion of FIG. 1.

Referring now more particularly to the drawings, FIG. 1 and FIG. 2 illustrate rotary machinery in the form of turbo machinery 10 including a turbine or compressor wheel 12 having a plurality of radially extending turbine blades thereon schematically depicted by the numeral 11. Wheel 12 is mounted upon and secured for rotation with a shaft 14 which, in turn, is rotatably mounted through a bearing 16 to a stationery housing in the form of an inner housing segment 18 and an outer housing segment 20. The bearing structure 16 illustrated may be a conventional anti-friction ball or roller bearing.

Housing segments 18 and 20 define therebetween an annularly shaped fluid damping chamber 22 which extends circumferentially all the way around bearing 16. Housing segment 20 further includes a fluid inlet 24 and smaller diameter fluid outlet or orifice 26 which both communicate with the fluid damping chamber 22. The housing may further include additional housing elements such as 28, along with appropriate sealing members 30 to close and substantially seal the annular damping chamber 22 so that the latter may contain pressurized oil flow therein.

Figure 3:
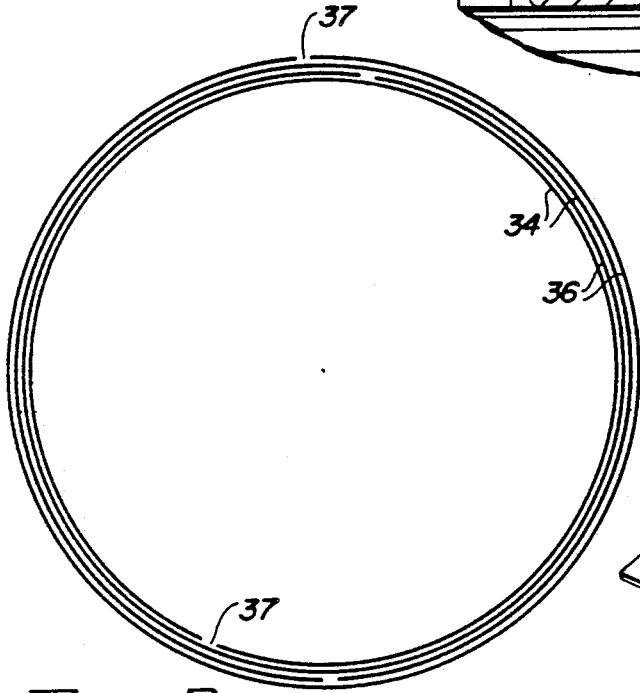
FIG. 3 is a side elevational view of the radially layered shims of the fluid bearing damper of the present invention.

As illustrated in greater detail in FIGS. 3 through 6, disposed within annular damping chamber 22 is improved damping structure 32 as contemplated by the present invention. Damper structure 32 comprises a plurality of layers or stacks of thin shims that are concentrically, radially stacked relative to one another. The shims are of two configurations, a first set of shims 34 being interdigitated or alternately stacked radially with a second set of shims 36. When disposed within the annular chamber 32 the stack of shims 34, 36 extend substantially radially across from housing segment 18 to segment 20, and, as shown in FIG. 3, extends circumferentially substantially around the entire annular chamber in full circular arrangement. In the embodiment illustrated each of the shims is prepared from separate sheet stock and the opposing ends of each shim are brought substantially adjacent to one another when wrapped circumferentially, circularly about chamber 32. Space 37 between adjacent ends of a particular shim is illustrated in FIG. 3.

Shims 34 of the first set are made of plain, flat sheet stock with opposed, parallel faces 38 and 40. In contrast to these "plain" shims 34 of the first set, each of the shims 36 of the second set are configured with outstanding legs or protrusions on opposite sides thereof for engagement with the adjacent shim 34 so as to carry radial loading between the housing segments 18 and 20. Legs or lands 42 extend radially outwardly from the major body of each shim 36, while the other legs or lands 44 extend radially inwardly therefrom. The legs 42, 44 define therebetween in conjunction with the next adjacent shim 34 a plurality of relatively thin, small, circumferentially separated, fluid damping cavities or spaces 46 in which the liquid damping action actually occurs.

Preferably the shims 36 and the shims 34 are each of equal radial thickness. The height of the lands or legs 42, 44 determine not only the radial thickness of the associated cavities 46, but also determine the relative stiffness of the shim 36 in carrying radial loads, as depicted by the arrow "F" shown in FIG. 6. Shims 36 may be conveniently and economically manufactured from flat sheet stock by coining, stamping, or by photochemical etching of the opposed surfaces thereof to leave the outstanding legs 42, 44 and the cavities 46.

Figure 4:
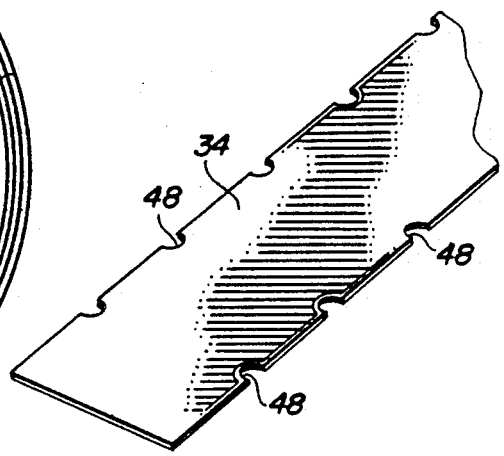
FIG. 4 is a partial, perspective, linear projection of a single shim.

In operation, the arrangement of concentric rings of shims 34, 36 produces a multiplicity of series loaded, radially stacked oil films within the cavities 46. More particularly, any radial excursion, orbiting or synchronously or non-synchronously induced radial motion of the turbine wheel 12, shaft 14, and bearing 16 induces radial loading upon the shims as illustrated by the arrows "F" of FIG. 6. Each cavity 46 is promptly at an effective, narrow depth upon imposition of the radial load so as to create the hydrodynamic balancing force therein and establish damping of the undesired radial motion due to shearing of the liquid therein. In this regard, a pressurized supply of incompressive hydraulic fluid is introduced through inlet 24 into the chamber 22 for flow into and through oil cavities 46. The outlet 26 is sized to restrict exhausting liquid flow to permit pressurization within each of the cavities 46. To promote fluid flow into and out of each cavity 46, the shims 34 have notches 48 as shown in FIG. 4. Similarly, though not shown, the shims 36 may also be provided with notched edges for communication with the circumferentially relieved inlet and outlet portions of chamber 22.

The degree of hydraulic damping is a function of the depth "d" of the cavities 46 as well as the number of the cavities 46 radially stacked relative to one another. The resulting multiple thin films have a higher spring rate and higher damping rate than a single film of the same total film thickness. Particularly, a single film of the same total film thickness as presented by the multiple films of the stack of cavities 46 would have less resistance to radial motion because that thicker single film would not become substantially functional until it has permitted sufficient radial motion so as to approach metal to metal condition to create the hydrodynamic resistance and shearing action. Thus, the structure of the present invention can permit greater radial motion than conventional dampers while still producing an effective damping action, even at small radial displacements.

The hydraulic damping action of the present invention provides a more linear characteristic relative to radial motion since the flow of oil through each of the very thin cavities 46 will remain laminar, and the resistance to flow of the oil will be linear over a larger range of radial excursion. As a result, this improved fluid damper may be designed for larger total radial motion and is capable of accommodating higher rotor eccentricities than a conventional single film arrangement.

As noted, the degree of hydraulic dampening is a function of the depth "d" and the number of concentric rings of shims introduced into the chamber 22. The effective subdividing of a given radial clearance into a variety of several thinner films enhances the squeeze film effect, the shearing action upon the oil, and the resulting damping. The improved operational capabilities of the damping structure of the present invention permits greater operational capability of the rotating machinery, particularly in the event of required limited operation upon a failure, such as loss of a blade 11, inducing significant imbalance in the rotating unit.

In addition to the dramatically improved hydraulic damping capacity of the present invention as described above, the arrangement also provides a mechanical restoring force for improved self-centering capability of the rotating unit, even if a relatively large rotating mass is involved. More particularly, the alternately radially inwardly and outwardly extending legs 42, 44 of shims 36 effectively define beams of thickness "t" and of a length "L". The net mechanical spring rate of the entire damper construction is easily calculated using standard equations for deflection of beams. By varying the beam length L, thickness t and ratio of film thickness d to shim thickness t, overstressing of the shims is avoided while still providing freedom to select a mechanical centering spring rate.

By use of the alternating location of the plain shims 34 and the coined or etched shims 36, a mechanical restoring force is available to reestablish the oil film between the adjacent layers after the film of oil has been squeezed out between the shims. Because the loading on any given circumferential segment of shims is cyclical in nature, the mechanical restoring force of the interdigitated shim design ensures that the oil film thickness is reestablished during the unloaded part of the load cycle. If this feature were omitted, the shims would collapse and stick together (by means of surface tension) and the system would degenerate to a single thick film of oil.

While as noted above the arrangement illustrated in FIGS. 1-6 contemplates separate segments for each of the shims 34, 36, a single continuous sheet stock could be configured with alternate sections of plain and etched portions. That continuous sheet could then be spirally wound inside the chamber 22 to produce structure as depicted in FIG. 5. For ease of assembly, the radially stacked shims 34, 36 could also be contained in a prefabricated cartridge, not illustrated.

FIG. 7 illustrates an alternate embodiment of the invention wherein the thickness of adjacent shims are varied to obtain a progressive mechanical spring rate or to vary the hydraulic damping and stiffness from layer to layer. As illustrated in FIG. 7, the adjacent shims 50, 52, 54, 56, 58 and 60 become progressively thicker in the radially outer layers in comparison to the radially inner layers. This permits further desired adjustment and/or control for linearity or non-linearity of either the mechanical spring restoring force, or the hydraulic damping force, or both.

Various other modifications and alterations to the embodiments of the invention specifically disclosed herein will also be apparent to those skilled in the art. Accordingly, to the extent that such alterations and variations come within the scope of the appended claim, such are intended to be included within the scope and spirit of the present invention.

Having described the invention with sufficient clarity that those skilled in the art may make and use it,

What is claimed is:

1. A fluid damper for a bearing, comprising:
   a first housing adapted to receive a bearing therewithin:
   a second housing extending radially outwardly from said first housing and cooperating therewith to define a closed annular fluid damping chamber, a fluid inlet and a fluid outlet for delivery and exhaust of damping fluid to and from said chamber; and
   a plurality of thin shims stacked radially between said first and second housings, define said shims configured and arranged to define radially stacked fluid damping cavities therebetween and to define circumferentially spaced, radially extending lands for circumferentially separating said cavities and for providing radial contact and support between said shims, each of said cavities being in fluid communication with said inlet and said outlet.

2. A damper as set forth in claim 1, wherein said plurality of shims includes a first set of substantially flat shims and a second set of shims having radial protrusions on opposite sides thereof defining said lands.

3. A damper as set forth in claim 2, wherein said first and second sets of shims are radially stacked in interdigitated relationship.

4. A damper as set forth in claim 3, wherein said radial protrusions alternately extend radially inwardly and radially outwardly.

5. A damper as set forth in claim 4, wherein all of said shims of said first set are of substantially equal radial thickness, and all of said shims of said second set are of substantially equal radial thickness.

6. A damper as set forth in claim 4, wherein said shims of said first set are of varying radial thickness, and said shims of said second set are of varying radial thickness.

7. A damper as set forth in claim 6, wherein said shims of said first and second sets are arranged with regularly increasing radial thickness in a radially outward direction.

8. A damper as set forth in claim 1, wherein said shims have notches on edges thereof facilitating communication of said cavities with said inlet and said outlet.

9. A damper as set forth in claim 1, wherein each of said shims extends circumferentially substantially completely around said damping chamber.

10. A fluid damper for a bearing, comprising:
    a first housing adapted to receive a bearing therewithin;
    a second housing extending radially outwardly from said first housing and cooperating therewith to define a closed annular fluid damping chamber, a fluid inlet and a fluid outlet for delivery and exhaust of damping fluid to and from said chamber; and
    fluid damping structure extending radially between said first and second housings and extending circumferentially around said chamber, said structure comprising a plurality of thin, radially stacked shims defining a plurality of radially stacked thin fluid damping cavities each of which communicates with said inlet and said outlet, at least a portion of said shims having radially protruding legs for providing radial support to said structure.

11. Turbomachinery comprising:
    a stationary housing having a fluid inlet and fluid outlet and including first and second housing segments defining an annular fluid damping chamber therebetween communicating with said fluid inlet and outlet;
    a rotary shaft extending through said housing;
    a bladed wheel mounted upon said shaft for rotation therewith;
    a bearing disposed between said shaft and said first housing segment for rotatably supporting said wheel to said housing; and
    a fluid damper disposed in said chamber and extending radially thereacross, said damper including first and second sets of shims radially stacked in alternating relationship, each of said shims of the first and second sets extending circumferentially substantially completely around said chamber, said shims of the first set having substantially flat, parallel, circumferentially extending surfaces, said shims of the second set having alternately radially inwardly and outwardly extending lands defining circumferentially separated fluid damping cavities therebetween, whereby said cavities of said fluid damper are disposed in radially stacked arrangement substantially completely around said chamber, each of said cavities being in fluid communication with said inlet and said outlet.

12. Turbomachinery comprising:
    a stationary housing having a fluid inlet and fluid outlet and including first and second housing segments defining an annular fluid damping chamber therebetween communicating with said fluid inlet and outlet;
    a rotary shaft extending through said housing;
    a bladed wheel mounted upon said shaft for rotation therewith;
    a bearing disposed between said shaft and said first housing segment for rotatably supporting said wheel to said housing; and
    fluid damping structure extending radially between said first and second housings and extending circumferentially around said chamber, said structure comprising a plurality of thin, radially stacked shims defining a plurality of radially stacked, thin fluid damping cavities each of which communicates with said inlet and said outlet, at least a portion of said shims having radially protruding legs for providing radial support to said structure.

* * * * *

UNITED STATES PATENT AND TRADEMARK OFFICE
CERTIFICATE OF CORRECTION

PATENT NO. : 4,992,024

DATED : Feb. 12, 1991

INVENTOR(S) : Hans Heydrich

It is certified that error appears in the above-identified patent and that said Letters Patent is hereby corrected as shown below:

Column 5, line 26, delete "define".

Signed and Sealed this

Fourteenth Day of July, 1992

Attest:

DOUGLAS B. COMER

Attesting Officer     Acting Commissioner of Patents and Trademarks